United States Patent
Moon et al.

(10) Patent No.: US 6,637,222 B2
(45) Date of Patent: Oct. 28, 2003

(54) SYSTEM FOR CONTROLLING STARTING OF AIR CONDITIONER AND CONTROL METHOD THEREOF

(75) Inventors: Joong-Ki Moon, Seoul (KR); Young-Man Kim, Seoul (KR); Jae-Myoung Moon, Suwon (KR); Jung-Min Lee, Suwon (KR); Jong-Youb Kim, Suwon (KR); Il-Yong Cho, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 28 days.

(21) Appl. No.: 10/019,533

(22) PCT Filed: Jan. 5, 2001

(86) PCT No.: PCT/KR01/00023

§ 371 (c)(1),
(2), (4) Date: Jan. 3, 2002

(87) PCT Pub. No.: WO01/94859

PCT Pub. Date: Dec. 13, 2001

(65) Prior Publication Data

US 2003/0074910 A1 Apr. 24, 2003

(30) Foreign Application Priority Data

Dec. 30, 2000 (KR) .............................. 10-2000-0086779
Jun. 7, 2002 (KR) .............................. 10-2000-0031142

(51) Int. Cl.[7] ....................... F25B 41/00; F25B 49/00
(52) U.S. Cl. ......................................... 62/157; 62/231
(58) Field of Search ....................... 62/157, 231, 196.3, 62/204, 207, 228.5

(56) References Cited

U.S. PATENT DOCUMENTS 5,303,562 A * 4/1994 Bahel et al. ................ 62/222
6,202,431 B1 * 3/2001 Beaverson et al. ........ 62/196.3

FOREIGN PATENT DOCUMENTS

| KR | 87-5221 A | 6/1987 |
| KR | 89-5469 A | 5/1989 |
| KR | 94-18623 A | 10/1994 |
| KR | 97-22002 A | 5/1997 |

* cited by examiner

Primary Examiner—William Wayner
(74) Attorney, Agent, or Firm—Staas & Halsey LLP

(57) ABSTRACT

A system for controlling the starting of an air conditioner includes a compressor controlled in a pulse width modulation according to a duty cycle control signal, an electronic expansion valve for expanding refrigerant compressed in the compressor, a high pressure conduit connecting the exit side of the compressor and the inlet side of the electronic expansion valve, a low pressure conduit connecting the exit side of the electronic expansion valve and the inlet side of the compressor, a bypass conduit connected at its first end to the high pressure conduit and at its second end to the low pressure conduit, and a flow rate regulating valve mounted on the bypass conduit for regulating a flow rate of fluid flowing through the bypass conduit. A control unit controls the compressor during the starting of the compressor in such a way that the electronic expansion valve is open, the flow rate regulating valve is open and a duty control signal shorter than a duty control signal during a normal operation is generated.

13 Claims, 6 Drawing Sheets

SYSTEM FOR CONTROLLING STARTING OF AIR CONDITIONER AND CONTROL METHOD THEREOF

TECHNICAL FIELD

The present invention relates generally to air conditioners, and in particular to a system and method for controlling the starting of an air conditioner that employs a pulse width modulated compressor.

BACKGROUND ART

With the enlargement of buildings, there is an increasing consumer demand for a multi-air conditioner in which a plurality of indoor units are connected to a single outdoor unit. In such a multi-air conditioner, the length of each refrigerant conduit connecting each indoor unit to the outdoor unit is long because the outdoor unit is relatively far away from the indoor unit, so the amount of filled refrigerant is large and liquid refrigerant can enter the compressor during the starting of the air conditioner.

In particular, if power supply to any indoor unit is abruptly cut off during the operation of a multi-air conditioner, there is increased a possibility that fluid refrigerant enters the compressor. When the power of an operated indoor unit is abruptly cut off during operation, an electronic expansion valve is not closed because power supply to the electronic expansion valve constituting an element of the indoor unit is cut off. Accordingly, high pressure liquid refrigerant situated in a refrigerant conduit between the condenser and the electronic expansion valve enters the compressor or an accumulator upstream of the compressor through the electronic expansion valve and the evaporator in a non-evaporated state.

This phenomenon is continued until the pressures of high and low pressure sides are balanced. The liquid refrigerant having entered the compressor is mixed with oil contained in the compressor to dilute the oil, so the lubrication of the friction portions of the compressor is deteriorated, thereby damaging the compressor.

Meanwhile, for the multi-air conditioner, a great cooling capacity is required and each indoor unit is frequently turn on/off, so the required cooling capacity is changed. In order to meet such a demand, a variable rotation number compressor having a large and variable capacity is employed in the multi-air conditioner. In such a variable rotation number compressor, the capacity of the compressor is regulated to be suitable for a variation in required cooling capacity in such a way that the rotation number of a motor is controlled by varying the frequency of current applied to the motor in an inverter control manner. However, the conventional variable rotation number compressor is problematic in that the rotation number of its motor cannot be controlled with a desirable response and a precision because the motor being rotated has to be controlled directly according to a required cooling capacity. Additionally, since the rotation number of the motor is frequently varied, vibrations and noises occur, thereby causing problems that the life spans of the motor and the compressor are shortened and the mechanical reliability of an entire system is deteriorated.

In addition, since an expensive and complicated circuit device is required and power consumption is great in order to vary the frequency of current applied to the motor, the conventional variable rotation number compressor is less efficient than a general compressor. Particularly, in the conventional variable rotation number compressor are required several power conversions of initially inputted commercial AC power into DC power and this DC power into AC power having a required frequency through converters, so the structure of the circuit device is complicated and noises are frequently generated in the circuit device.

In addition, a large-capacity, variable rotation number compressor is problematic in that it is difficult to control the compressor, the efficiency of the compressor is low, the size of the compressor is large and the cost of the compressor is high, so it is difficult to fulfill large-capacity requirements with the variable rotation number compressor. Accordingly, in order to fulfill a large capacity requirement two or more compressors are employed. In this case, a standard compressor in which its motor is rotated at a constant speed is generally utilized together with the variable rotation number compressor. If a plurality of compressors are utilized, the entire size of an outdoor unit is enlarged and, accordingly, the handling of the outdoor unit becomes difficult.

Pulse width modulated compressors are disclosed as other variable capacity compressors in U.S. Pat. No. 6,047,557 and Japanese Unexamined Pat. Publication No. Hei 8-334094. These compressors are utilized in refrigerating systems each having a plurality of freezing compartments or refrigerating compartments, and designed to be directly applied to short piping in which the portion of a refrigerant conduit situated between a compressor and an evaporator is short. Consequently, these compressors cannot be applied to air conditioning systems for buildings that indispensably employ long piping and are given control environments different from those for the refrigerating systems. Additionally, in the prior art, there is not disclosed a control system and method for utilizing a pulse width modulated compressor in an multi-air conditioner, and in particular a control system and method for rapidly and safely performing the starting of an air conditioner.

DISCLOSURE OF THE INVENTION

Accordingly, the present invention has been made keeping in mind the above problems occurring in the prior art, and an object of the present invention is to provide a system and method for controlling the starting of an air conditioner employing a pulse width modulated compressor, which is capable of rapidly and safely performing the starting of the air conditioner.

Another object of the present invention is to provide a system and method for controlling the starting of an air conditioner, which is capable of preventing the inflow of liquid refrigerant in the air conditioner employing a pulse width modulated compressor.

In order to accomplish the above objects, in accordance with the principles of the present invention, a system for controlling the starting of an air conditioner comprises a compressor controlled in a pulse width modulation manner according to a duty control signal; an electronic expansion valve for expanding refrigerant compressed in the compressor; a high pressure conduit connecting the exit side of the compressor and the inlet side of the electronic expansion valve; a low pressure conduit connecting the exit side of the electronic expansion valve and the inlet side of the compressor; a bypass conduit connected at its first end to the high pressure conduit and at its second end to the low pressure conduit; a flow rate regulating valve mounted on the bypass conduit for regulating a flow rate of fluid flowing through the bypass conduit; and a control unit for controlling the compressor during the starting of the compressor in such a way that the electronic expansion valve is opened, the flow rate regulating valve is opened and a duty control signal shorter than a duty control signal for a normal operation is generated.

Additionally, in accordance with another aspect of the principles of the present invention, a system for controlling the starting of an air conditioner, comprising: a compressor controlled in a pulse width modulation manner according to a duty control signal; an electronic expansion valve for expanding refrigerant compressed in the compressor; a high pressure conduit connecting the exit side of the compressor and the inlet side of the electronic expansion valve; a low pressure conduit connecting the exit side of the electronic expansion valve and the inlet side of the compressor; a bypass conduit connected at its first end to the high pressure conduit and at its second end to the low pressure conduit; a flow rate regulating valve mounted on the bypass conduit for regulating a flow rate of fluid flowing through the bypass conduit; and a control unit for controlling the flow rate regulating valve, the electronic expansion valve and the compressor to prevent liquid refrigerant from entering the compressor during a starting operation of the compressor.

Additionally, in accordance with yet another aspect of the principles the present invention, a method for controlling the starting of an air conditioner comprises determining whether a starting signal is inputted to a compressor controlled in a pulse width modulation manner according to a duty control signal; and operating the compressor for a predetermined time while closing the electronic expansion valve and opening the flow rate regulating valve mounted on the bypass conduit connecting exit and inlet sides of the compressor, when the starting signal is inputted.

DESCRIPTION OF REFERENCE CHARACTERS OF PRINCIPLE PARTS

Figure 1:
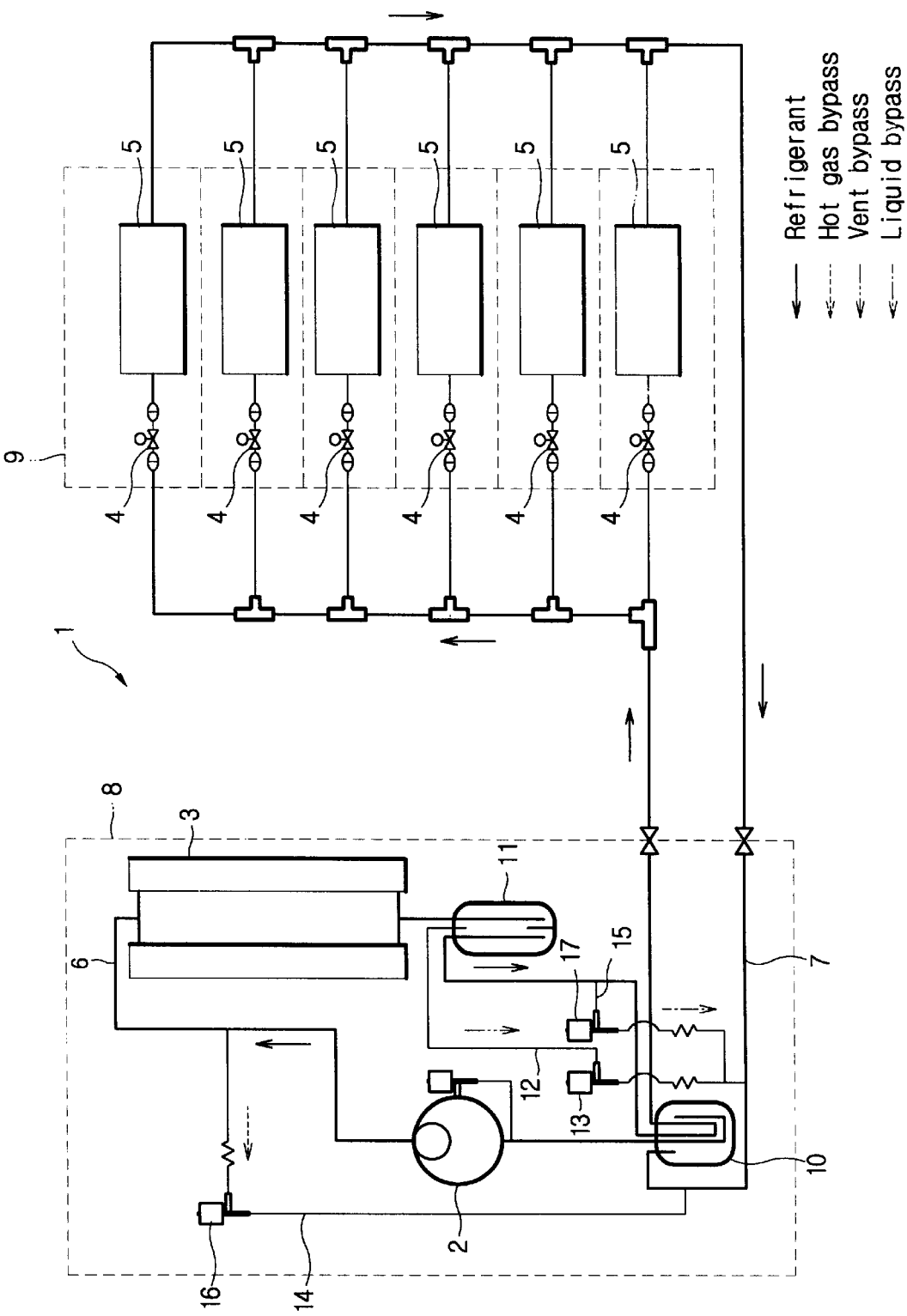
FIG. 1 is a diagram showing the cycle of a system for controlling the starting of an air conditioner in accordance with the present invention.

2: compressor
4: electronic expansion valve
5: evaporator
8: outdoor unit
9: indoor unit
13: vent valve
16: hot gas valve
17: liquid valve
26: pulse width modulated valve
27: outdoor control unit

BEST MODE FOR CARRYING OUT THE INVENTION

Hereinafter, embodiments of the present invention are described in detail with reference to accompanying drawings. FIG. 1 is a diagram showing an embodiment of the cycle of a system for controlling the starting of an air conditioner in accordance with the principles of the present invention. The air conditioner 1 of the present invention includes a compressor 2, a condenser 3, a plurality of electronic expansion valves 4, and a plurality of evaporators 5, which are connected to each other by refrigerant conduits to form a closed circuit. Of the refrigerant conduits, a refrigerant conduit connecting the outflow side of the compressor 2 to the inflow side of the electronic expansion valves 4 is a high pressure conduit 6 for guiding the flow of high pressure refrigerant discharged from the compressor 2, while a refrigerant conduit connecting the outflow side of the electronic expansion valves 4 to the inflow side of the compressor 2 is a low pressure conduit 7 for guiding the flow of low pressure refrigerant expanded in the electronic expansion valves 4. The condenser 3 is situated on the high pressure conduit 6, while the evaporators 5 are situated on the low pressure conduit 7. While the compressor 2 is operated, refrigerant flows in solid arrow directions.

The air conditioner 1 includes an outdoor unit 8 and a plurality of indoor units 9. The outdoor unit 8 includes the above described compressor 2 and condenser 3. The outdoor unit 8 further includes an accumulator 10 situated on the low pressure conduit 7 upstream of the compressor 2 and a receiver 11 situated on the high pressure conduit 6 downstream of the condenser 3. The accumulator 10 serves to collect and evaporate liquid refrigerant having not been evaporated and allow evaporated refrigerant to flow into the compressor 2. If refrigerant is not evaporated completely in the evaporators 5, refrigerant entering the accumulator 10 is a mixture of liquid refrigerant and gaseous refrigerant. The accumulator 10 evaporates liquid refrigerant, and allows only gaseous refrigerant (gas refrigerant) to enter the compressor 2. To this end, it is desirable to situate the entrance and exit ends of the refrigerant conduit in the upper portion of the accumulator 10.

If refrigerant is not condensed completely in the condenser 3, refrigerant entering the receiver 11 is a mixture of liquid refrigerant and gaseous refrigerant. The receiver 11 is constructed to separate the liquid refrigerant and the gaseous refrigerant from each other and to allow only the liquid refrigerant to be discharged. To this end, the entrance and exit ends of the refrigerant conduit situated inside of the receiver 11 are extended to the lower portion of the receiver 11.

In order to bypass gaseous refrigerant situated in the receiver 11, a vent bypass conduit 12 is provided to connect the receiver 11 to the low pressure conduit 7 upstream of the accumulator 10. The entrance end of the vent bypass conduit 12 is situated in the upper portion of the receiver 11, so only gaseous refrigerant enters the vent bypass conduit 12. A vent valve 13 is provided on the vent bypass conduit 12 and controls the flow rate of gaseous refrigerant bypassed. Double dotted arrows indicate the flow direction of the gaseous refrigerant flowing through the vent bypass conduit 12.

The portion of the high pressure conduit 6 extended from the receiver 11 is constructed to pass through the accumulator 10. This construction is to evaporate the liquid refrigerant of low temperature collected in the accumulator 10 by using the refrigerant of relatively high temperature passing through the high pressure conduit 6. In order to effectively evaporate the refrigerant, the portion of the low pressure conduit 7 situated in the accumulator 10 is formed in the shape of U, while the portion of the high pressure conduit 6 passing through the accumulator 10 is positioned to pass through the interior of the U-shaped portion of the low pressure conduit 7.

The outdoor unit 8 further includes a hot gas bypass conduit 14 connecting the portion of the high pressure conduit 6 between the compressor 2 and the condenser 3 to the accumulator 10, and a liquid bypass conduit 15 connecting the downstream side of the receiver 11 and the upstream side of the accumulator 10. A hot gas valve 16 is situated on the hot gas bypass conduit 14 to control the flow rate of hot gas bypassed, and a liquid valve 17 is situated on the liquid bypass conduit 15 to control the flow rate of liquid refrigerant bypassed. Accordingly, when the hot gas valve 16 is opened, a portion of hot gas discharged from the compressor 2 flows along the hot gas bypass conduit 14 in the direction indicated by the dotted arrow of FIG. 1; when the liquid valve 17 is opened, a portion of liquid refrigerant discharged from the receiver 11 flows along the liquid bypass conduit 15 in the directions indicated by the double dotted arrow of FIG. 1.

A plurality of indoor units 9 are arranged in parallel. Each of the indoor units 9 includes an electronic expansion valve 4 and an evaporator 5. Consequently, a plurality of indoor units 9 are connected to a single outdoor unit 8. The capacities and shapes of indoor units may be identical with or different from one another.

Figure 2A:
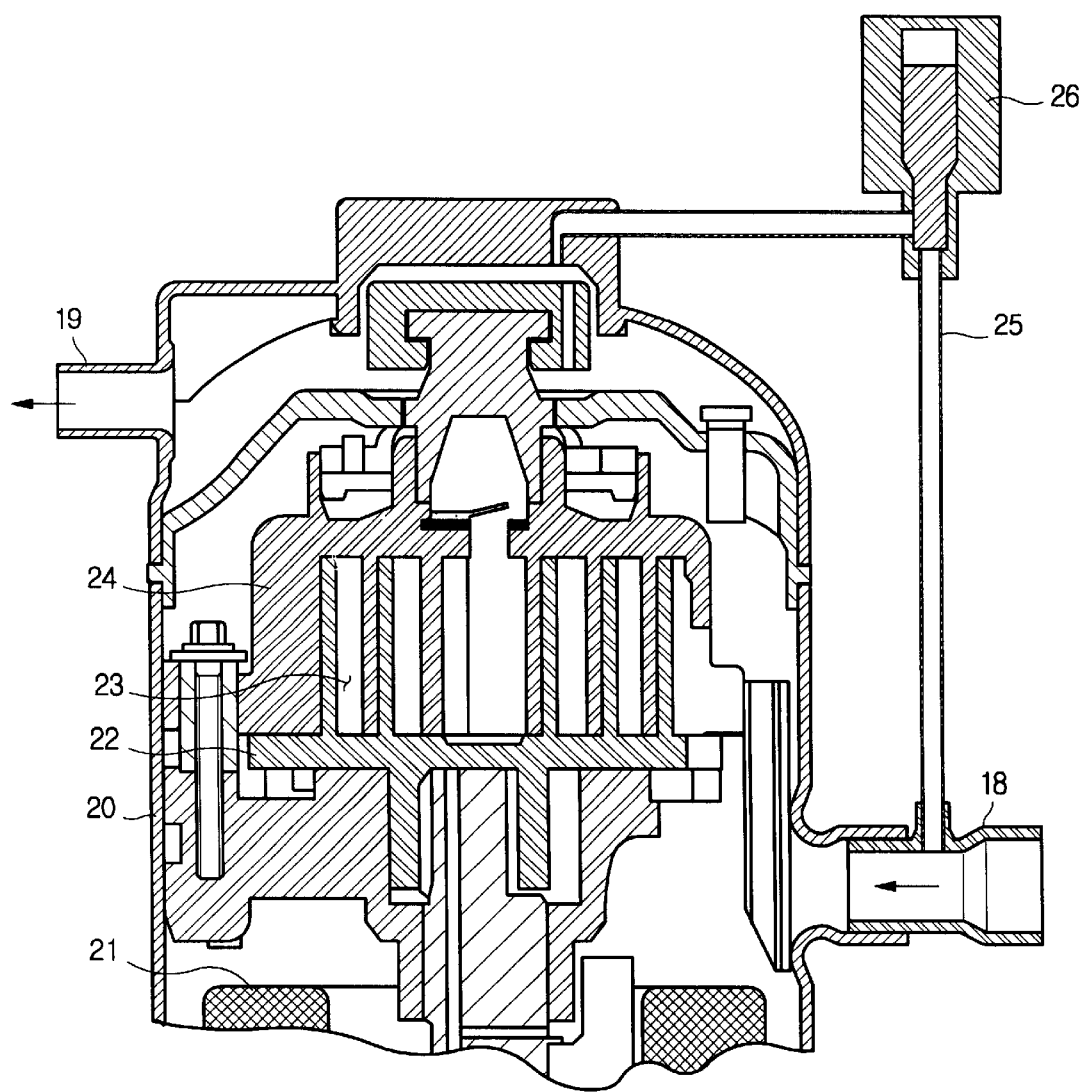
FIG. 2a is a sectional view showing a pulse width modulated compressor in a loading position.
Figure 2B:
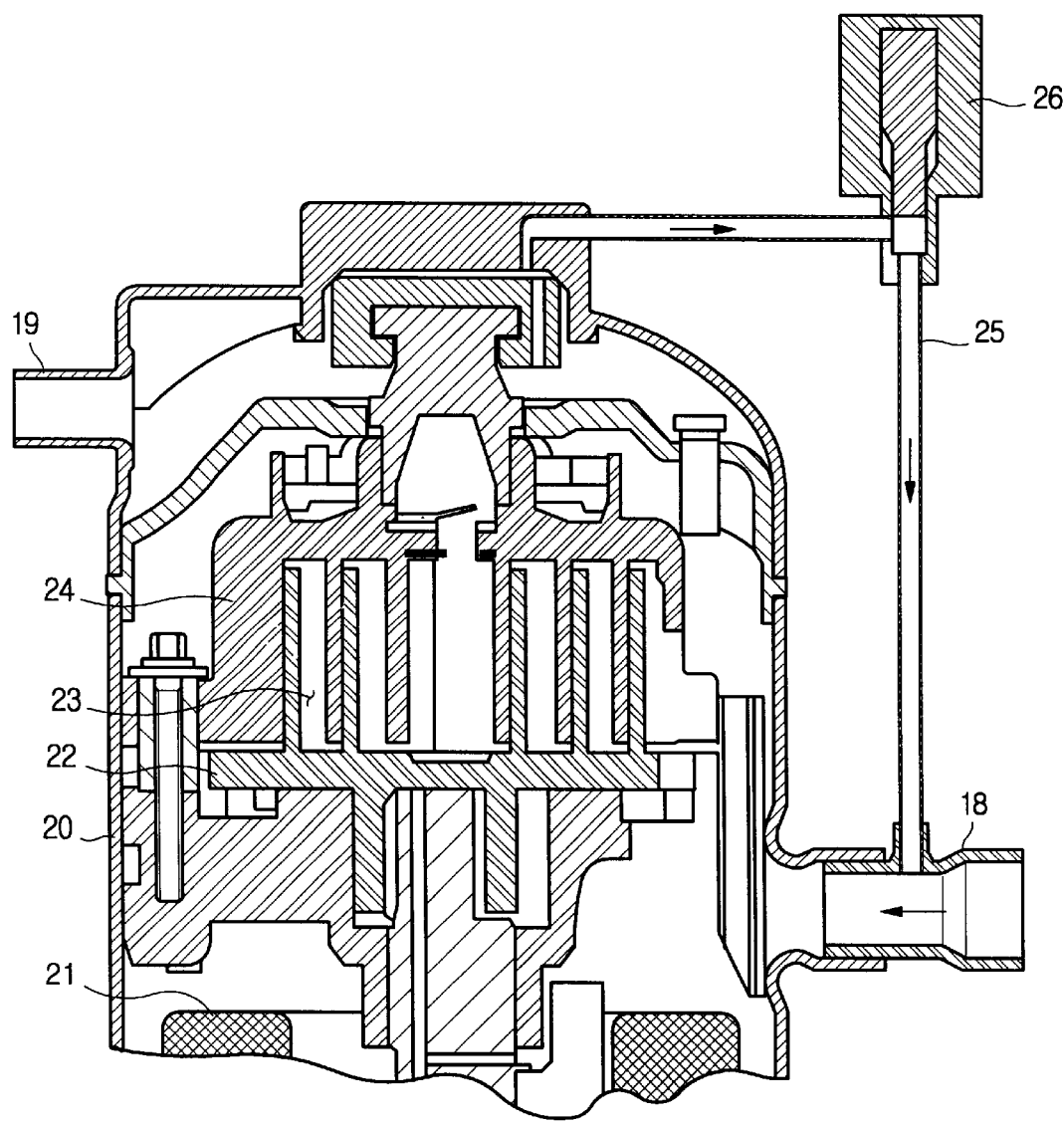
FIG. 2b is a sectional view showing the pulse width modulated compressor in an unloading position.

As depicted in FIGS. 2a and 2b, a variable capacity compressor controlled in a pulse width modulation fashion is employed as the compressor 2. The compressor 2 includes a casing 20 provided with an inlet 18 and an outlet 19, a motor 21 situated in the casing 20, a rotating scroll 22 rotated by the rotating force of the motor 21, and a stationary scroll 24 defining a compressing chamber 23 together with the rotating scroll 22. A bypass conduit 25 is attached to the casing 20 to connect a position over the stationary scroll 24 to the inlet 18, and a PWM valve (Pulse Width Modulated Valve) 26 in the form of a solenoid valve is mounted on the bypass conduit 25. In FIG. 2a, the PWM valve 26 is OFF and closes the bypass conduit 25. In this state, the compressor 2 discharges refrigerant. This state is referred to as "a loading state", and in this state the compressor 2 is operated at 100% capacity. In FIG. 2a, the PWM valve 26 is ON and opens the bypass conduit 25. In this state, the compressor 2 does not discharge refrigerant. This state is referred to as "a unloading state", and in this state the compressor 2 is operated at 0% capacity. Power is supplied to the compressor 2 regardless of the loading and unloading states, and the motor 21 is rotated at a constant speed. When power is not supplied to the compressor 2, the motor 21 is not rotated and the compressor 2 is not operated.

Figure 3:
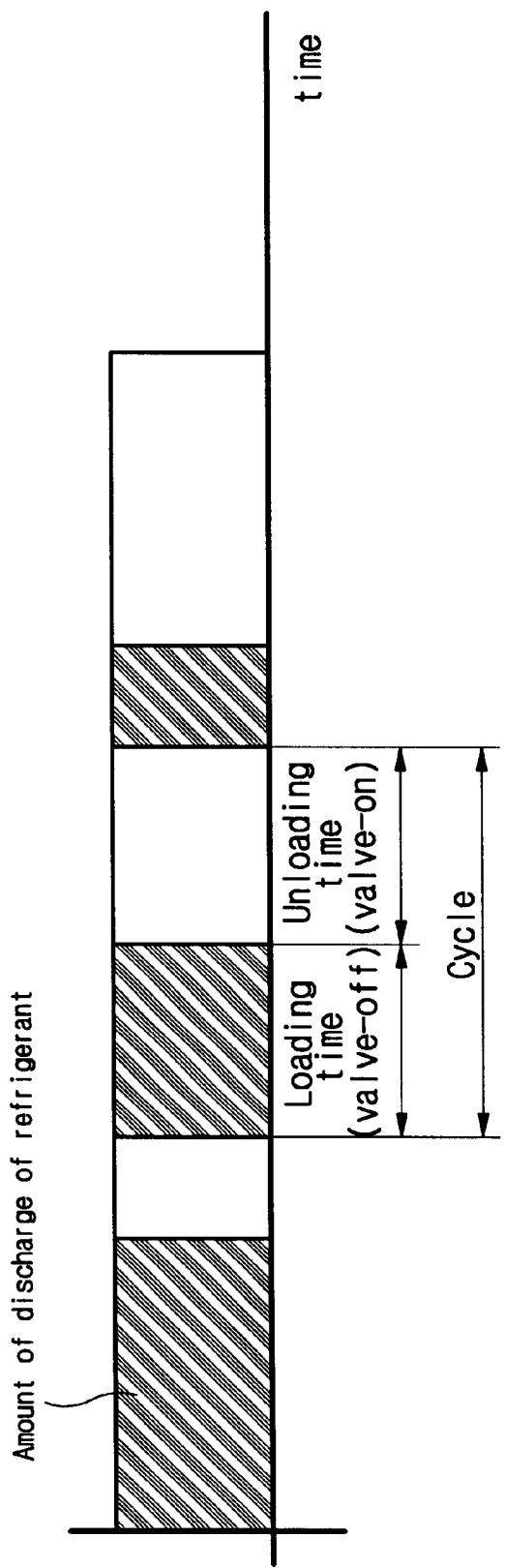
FIG. 3 is a graph showing a relationship among a loading time, an unloading time and the amount of discharged refrigerant during the operation of the compressor of FIGS. 2a and 2b.

As shown in FIG. 3, the compressor 2 periodically undergoes the loading and unloading states during its operation. Loading time and unloading time vary according to required cooling capacity. During the loading time the temperature of the evaporator 5 is decreased because the compressor 2 discharges refrigerant, while during the unloading time the temperature of the evaporator 5 is increased because the compressor 2 does not discharge refrigerant. In FIG. 3, the hatched portions indicate the amount of discharged refrigerant. A signal for controlling loading and unloading times is referred to as a duty control signal. In the embodiments of the present invention, the capacity of the compressor 2 is varied in such a way that the loading and unloading times are varied according to the required total cooling capacity of the compressor 2 while each period is kept constant, for example, 20 seconds.

Figure 4:
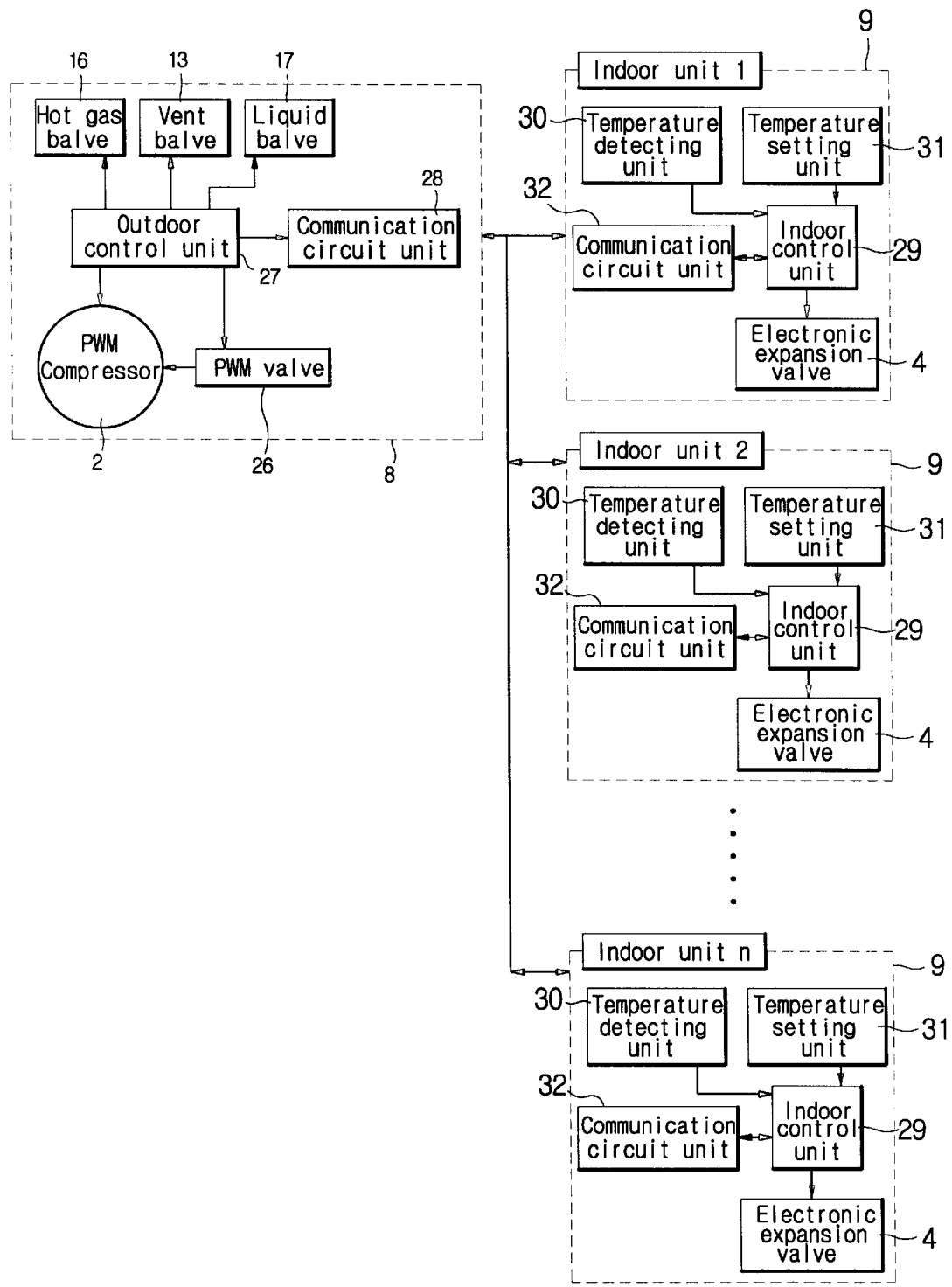
FIG. 4 is a block diagram showing the system for controlling the starting of an air conditioner in accordance with the present invention.

FIG. 4 is a block diagram showing the system for controlling the starting of an air conditioner in accordance with the present invention. As illustrated in FIG. 4, the outdoor unit 8 includes an outdoor control unit 27 that is connected to the compressor 2 and the PWM valve 26 to transmit and receive a signal. The outdoor control unit 27 is connected to an outdoor communication circuit unit 28 to transmit and receive data, and connected to the vent valve 13, the hot gas valve 16 and the liquid valve 17 to control the operation of these valves if necessary. Each of indoor units 9 includes an indoor control unit 29. A temperature detecting unit 30 and a temperature setting unit 31 are connected to the input port of the indoor control unit 29, and the electronic expansion valve 4 is connected to the output port of the indoor control unit 29. The temperature detecting unit 30 is a temperature sensor for sensing the temperature of a room to be air-conditioned. Each indoor unit 9 includes an indoor communication circuit unit 32 connected to an indoor control unit 29 to transmit and receive data. The outdoor communication circuit unit 28 and the indoor communication circuit unit 32 are constructed to transmit and receive data in a wire or wireless fashion.

In the present invention, the operations of the compressor 2 are divided into a normal operation and a starting operation. The normal operation designates the operation of the compressor that will be performed according to information on a required cooling capacity transmitted from the indoor unit after power is applied to the compressor and the starting of the compressor has been completed, while the starting operating designates the operation of the compressor that will be performed to start the compressor when a starting signal is transmitted to the compressor.

In a normal operation mode, the indoor control unit 29 receives signals from the temperature detecting unit 30 and the temperature setting unit 31, and calculates the required cooling capacity of the indoor unit 9 on the basis of the difference between an indoor temperature and a set temperature. Additionally, the indoor control unit 29 has information on the cooling capacity of the indoor unit itself, and can calculate a required cooling capacity on the basis of the difference between an indoor temperature and a set temperature and the cooling capacity of the indoor unit itself. The required cooling capacity of each indoor unit calculated as described above is transmitted through the communication circuit units 28 and 32 to the outdoor control unit 27. The outdoor control unit 27 calculates a total required cooling capacity to which the required cooling capacities of all the indoor units 9 add up. The compressor 2 is operated with its loading time and unloading time alternating with each other, which are preset depending on the total required cooling capacity.

Figure 5:
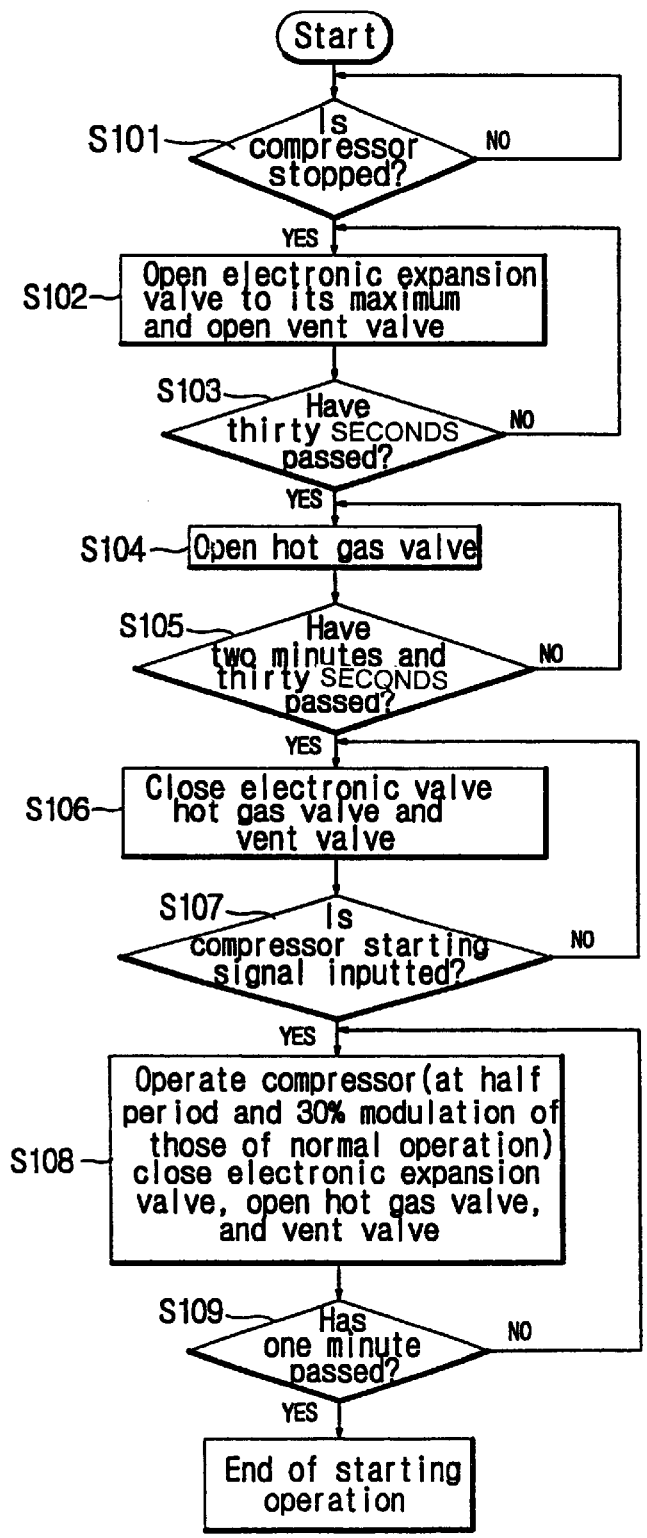
FIG. 5 is a flowchart showing a method for controlling the starting of an air conditioner in accordance with the present invention.

With reference to FIG. 5, a pressure balancing process prior to a starting operation and the starting operation are described. First, the outdoor control unit 27 determines whether the compressor 2 is stopped (S101). If the compressor 2 is stopped, the electronic expansion valve 4 and the vent valve 13 are completely opened (S102 and S103). It is determined whether thirty seconds have passed (S103). If thirty seconds have passed, the hot gas valve 16 is opened. Thereafter, it is determined whether two minutes and thirty seconds, have passed after the hot gas valve 16 is opened (S105, three minutes after the electronic valve 4 and the vent valve 13 are opened). If two minutes and thirty seconds have passed, the electronic expansion valve 4, the vent valve 13 and the hot gas valve 16 are closed (S106). The reason why the pressure balancing process of three minutes is performed is to reduce starting load at the early stage of starting by balancing high and low pressure in a cycle. In such a case, three minutes is a time required to balance high and low pressure in the cycle, but the time may be changed depending on particular systems.

Subsequently, the starting operation will be described. The starting operation is performed under the control of the outdoor control unit 27. First of all, it is determined whether a starting signal for the compressor 2 is inputted (S107). If the starting signal is inputted, the compressor 2 is operated, the electronic expansion valve 4 is closed and the hot gas valve 16 and the vent valve 13 are opened (S109). In this case, the period of a duty control signal for the normal operation. The reason why the period of the starting operation is set to be shorter than the period of the normal operation is that is the compressor 2 is operated by the periods of the normal operation, pressure fluctuation becomes great, thereby deteriorating the reliability of the compressor 2 and causing the safe starting of the compressor 2 to be difficult. Additionally, when the unloading time is relatively long during a normal operation, the starting of the compressor 2 takes a long time; while when the loading time is relatively long, a pressure drop becomes great and liquid refrigerant may flow from the accumulator 10 to the compressor 2. Accordingly, if the loading time is determined as being relatively short and a loading operation is frequently performed, the starting of the compressor can be accomplished rapidly and safely.

In this embodiment, the period of the starting operation is 20 to 80% of the period of the normal operation, preferably 50%. The reason why the lowermost limit of the period of the starting operation is determined as 20% is that the loading time and the unloading time are set by the second and there is a restriction in the reduction of the lowermost limit. The reason why the uppermost limit is determined as 80% is that if the uppermost limit is determined as more than 80%, there is nearly no effect of the reduction of the period. Therefore, when the period of the normal operation is twenty seconds, the period of the starting operation is four to sixteen seconds, preferably, ten seconds.

During the starting operation, the compressor is operated at 20 to 50% modulation. 20% modulation means that the compressor is operated while a two-second loading time and an eight-second unloading time are alternated, and 50% modulation means that the compressor is operated while a five-second loading time and a five-second unloading time are alternated. However, 30% modulation is preferable. In this case, a loading and unloading time ratio is 3:7. The reasons why the starting operation is performed at 50% or less modulation are that a limitation is imposed on an increase in modulation because the starting operation is not a normal operation and the reliability of the compressor may be deteriorated because a great pressure drop occurs due to an increase in modulation in a low temperature starting operation.

The reason why all the electronic expansion valves 4 are closed while the starting operation is performed is to prevent liquid refrigerant, which is contained in the receiver 11 and the evaporator 5 and has passed through the condenser 3, from entering the accumulator all at once and, thereafter, the compressor 2. Additionally, the electronic expansion valves 4 are closed, so the portion of the refrigerant conduit between each evaporator 5 and the compressor 2 and the inlet of the compressor 2 are rapidly depressurized, thereby allowing rapid starting to be accomplished.

In the meantime, when the compressor 2 is operated while all the electronic expansion valves 4 are closed, the pressure of refrigerant between each electronic expansion valve and the compressor 2 greatly drops and refrigerant is not circulated normally, resulting in the overheating of the compressor 2. Thus the hot gas valve 16 is opened to connect the exit side of the compressor 2 with upstream of the accumulator 10. Accordingly, a portion of hot gas enters the accumulator 10, so the pressure of refrigerant situated in the accumulator 10 is prevented from greatly dropping and the compressor 2 is normally operated.

In addition, since refrigerant is not circulated normally while all the electronic expansion valves 4 are closed, refrigerant condensed in the condenser 3 cannot enter the receiver 11 rapidly. Accordingly, liquid refrigerant is allowed to flow into the receiver 11 in such a way that gaseous refrigerant contained in the receiver 11 is discharged to the low pressure side by opening the vent valve 13.

The liquid valve 17 is opened when the degree of overheating of refrigerant sucked into the compressor 2 is high and a liquid ingredient is required to be supplemented.

In the meantime, STEP 108 is performed for about one to five minutes, preferably, one minute. Accordingly, it is determined whether STEP 108 has been performed for one minute (S109). If so, the starting operation is stopped; while if not, STEP 108 is continued to be performed. The time of starting operation is determined not only to achieve the goal of starting operation but also to rapidly start a cooling operation. When safe starting is primarily considered, it is desirable to perform the starting operation for a sufficient time. If so, the normal operation or the cooling operation is delayed. Although in this embodiment the time of the starting operation is one minute, five minutes may be selected if a safe starting operation is pursued though a cooling operation is somewhat delayed.

INDUSTRIAL APPLICABILITY

As described above, the present invention provides a system and method for controlling the starting of an air conditioner, in which a pulse width modulated compressor is employed and the electronic expansion valve, the hot gas valve and the vent valve are suitably controlled, thereby allowing the starting of the air conditioner to be performed rapidly and safely. Additionally, the system and method for controlling the starting of an air conditioner is capable of preventing the inflow of liquid refrigerant in the air conditioner while the compressor is operated.

What is claimed is:

1. A system for controlling starting operation of an air conditioner, comprising:
   a compressor controlled in a pulse width modulation manner according to a duty control signal;
   an electronic expansion valve for expanding refrigerant compressed in said compressor;
   a high pressure conduit connecting the exit side of said compressor and the inlet side of said electronic expansion valve;
   a low pressure conduit connecting the exit side of said electronic expansion valve and the inlet side of said compressor;
   a bypass conduit connected at its first end to said high pressure conduit and at its second end to said low pressure conduit;
   a flow rate regulating valve mounted on said bypass conduit for regulating a flow rate of fluid flowing through said bypass conduit; and
   a control unit for controlling said electronic valve, said flow rate regulating valve and said compressor during a starting operation of said compressor in such a way that said electronic expansion valve is closed, said flow rate regulating valve is open and said compressor being controlled by a duty control signal having a period shorter than a period of a duty control signal for a normal operation.

2. The system according to claim 1, further comprising:

an accumulator mounted on said low pressure conduit, wherein said bypass conduit is a hot gas bypass conduit connecting a high pressure conduit between said compressor and said condenser and said accumulator, and said flow rate regulating valve is a hot gas valve mounted on said hot gas bypass conduit.

3. The system according to claim 1, further comprising an accumulator mounted on said low pressure conduit, and a receiver mounted on a high pressure conduit downstream of said condenser, wherein said bypass conduit is a vent bypass conduit connecting said receiver and a upstream side of said accumulator, and said flow rate regulating valve is a vent valve mounted on said vent bypass conduit.

4. The system according to claim 1, wherein said period of said duty control signal of said compressor for said starting operation is 20 to 80% of said period of said duty control signal of said compressor for said normal operation.

5. The system according to claim 1, wherein said compressor is operated at a loading and unloading time ratio of 2:8 to 5:5 during said starting operation of the compressor.

6. The system according to claim 1, said starting operation of the compressor is performed for one to five minutes.

7. The system according to claim 1, wherein said duty signal has a period of four to sixteen seconds during said starting operation of the compressor.

8. A system for controlling the starting of an air conditioner, comprising:

a compressor controlled in a pulse width modulation manner according to a duty control signal;

an electronic expansion valve for expanding refrigerant compressed in said compressor;

a high pressure conduit connecting the exit side of said compressor and the inlet side of said electronic expansion valve;

a low pressure conduit connecting the exit side of said electronic expansion valve and the inlet side of said compressor;

a bypass conduit connected at its first end to said high pressure conduit and at its second end to said low pressure conduit;

a flow rate regulating valve mounted on said bypass conduit for regulating a flow rate of fluid flowing through said bypass conduit; and a control unit for controlling said flow rate regulating valve, said electronic expansion valve and said compressor to prevent liquid refrigerant from entering said compressor during a starting operation of said compressor.

9. A method for controlling the starting of an air conditioner, comprising:

determining whether a starting signal is inputted to a compressor controlled in a pulse width modulation according to a duty control signal; and operating said compressor for a predetermined time while closing an electronic expansion valve and opening a flow rate regulating valve mounted on a bypass conduit connecting exit and inlet sides of said compressor, when said starting signal is inputted.

10. The method according to claim 9, wherein in said compressor operating is performed in such a way that said compressor is operated by a duty control signal having a period shorter than a period of a duty control signal for a normal operation.

11. The method according to claim 9, wherein said compressor operating is performed in such a way that said compressor is operated by a duty control signal having a period corresponding to 20 to 80% of a period of a duty control signal for a normal operation.

12. The method according to claim 9, wherein said compressor operating is performed at a loading and unloading time ratio of 2:8 to 5:5.

13. The method according to claim 9, wherein said compressor operating is performed for one to five minutes.

* * * * *